United States Patent
Neuhaus et al.

(10) Patent No.: US 12,459,652 B2
(45) Date of Patent: Nov. 4, 2025

(54) MANUFACTURING METHOD FOR MANUFACTURING A PROFILE RAIL, PROFILE RAIL OBTAINABLE THEREBY, MOUNTING SYSTEM AND VEHICLE EQUIPPED THEREWITH AND USE OF THE PROFILE RAIL

(71) Applicant: Airbus Operations GmbH, Hamburg (DE)

(72) Inventors: Frank Neuhaus, Hamburg (DE); Stefan Tacke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/363,413

(22) Filed: Aug. 1, 2023

(65) Prior Publication Data
US 2024/0043125 A1    Feb. 8, 2024

(30) Foreign Application Priority Data
Aug. 3, 2022   (EP) ..................................... 22188599

(51) Int. Cl.
*C23C 24/04* (2006.01)
*B64D 11/06* (2006.01)

(52) U.S. Cl.
CPC .......... *B64D 11/0696* (2013.01); *C23C 24/04* (2013.01)

(58) Field of Classification Search
CPC .................... B64D 11/0696; C23C 24/04
See application file for complete search history.

(56) References Cited

U.S. PATENT DOCUMENTS

| | | | |
|---|---|---|---|
| 7,229,700 B2 | 6/2007 | Ruggiero et al. | |
| 9,522,734 B2 | 12/2016 | Mazidi et al. | |
| 10,472,070 B2 | 11/2019 | Born et al. | |
| 11,167,864 B2 | 11/2021 | Cawthorne et al. | |
| 11,629,411 B2 | 4/2023 | Rack | |
| 2006/0088725 A1* | 4/2006 | Ruggiero | C22C 21/10 428/650 |
| 2006/0093736 A1 | 5/2006 | Raybould et al. | |
| 2006/0292392 A1 | 12/2006 | Froning et al. | |

(Continued)

FOREIGN PATENT DOCUMENTS

| | | |
|---|---|---|
| DE | 102015100189 A1 | 7/2016 |
| DE | 102016208650 A1 | 11/2017 |

(Continued)

OTHER PUBLICATIONS

European Search Report for corresponding European Patent Application No. 22188599 dated Dec. 21, 2022; priority document.

(Continued)

*Primary Examiner* — Nathan H Empie
(74) *Attorney, Agent, or Firm* — Greer, Burns & Crain, Ltd.

(57) ABSTRACT

A method for manufacturing a profile rail including a base made of a first material and a top portion to be exposed during use of the profile rail in the floor of a vehicle including a second material that is harder and/or less corrosive as the first material. The method includes the steps of providing the base made of the first material, coating at least the top portion of the base with the second material by a cold spray process, and machining the coating to provide a predefined surface structure of the top portion.

4 Claims, 5 Drawing Sheets

(56) References Cited

U.S. PATENT DOCUMENTS

| | | | |
|---|---|---|---|
| 2007/0221746 A1* | 9/2007 | Heinrich | B05B 7/1486 |
| | | | 239/398 |
| 2009/0130327 A1 | 5/2009 | Erdmann et al. | |
| 2009/0302157 A1 | 12/2009 | Ricaud | |
| 2010/0119700 A1 | 5/2010 | Kim | |
| 2013/0078480 A1* | 3/2013 | Sachdev | B32B 15/017 |
| | | | 72/47 |
| 2016/0130004 A1 | 5/2016 | Vichniakov et al. | |
| 2019/0092478 A1* | 3/2019 | Gilbert | B64D 11/0696 |
| 2020/0094970 A1 | 3/2020 | Galliot | |
| 2020/0317321 A1 | 10/2020 | Tiryaki et al. | |
| 2022/0033054 A1 | 2/2022 | Fangmeier et al. | |
| 2022/0289390 A1 | 9/2022 | Fangmeier et al. | |

FOREIGN PATENT DOCUMENTS

| | | | | |
|---|---|---|---|---|
| DE | 102019109149 A1 | 10/2020 | | |
| DE | 102019133362 A1 | 6/2021 | | |
| EP | 1544105 A1 * | 6/2005 | | B60P 7/0815 |
| EP | 2027305 B1 | 5/2010 | | |
| EP | 2848533 A1 | 3/2015 | | |
| EP | 3401419 B1 | 11/2018 | | |
| FR | 2864940 A1 | 7/2005 | | |
| FR | 3048980 A1 | 9/2017 | | |
| GB | 2321626 A * | 8/1998 | | A61G 3/0808 |

OTHER PUBLICATIONS

A. Astarita et al., "On the Improvement of AA2024 Wear Properties Through the Deposition of a Cold-Sprayed Titanium Coating" Metals 2016, http://www.mdpi.com/2075-4701/6/8/185; 12 pages.

Cold spraying—Wikipedia, downloaded on Jul. 21, 2022 from https://en.wikipedia.org/wiki/Cold_spraying.

Machining—Wikipedia, downloaded on Jul. 21, 2022 from https://en.wikipedia.org/wiki/Machining.

* cited by examiner

Fig. 14

MANUFACTURING METHOD FOR MANUFACTURING A PROFILE RAIL, PROFILE RAIL OBTAINABLE THEREBY, MOUNTING SYSTEM AND VEHICLE EQUIPPED THEREWITH AND USE OF THE PROFILE RAIL

CROSS-REFERENCES TO RELATED APPLICATIONS

This application claims the benefit of the European patent application No. 22188599.9 filed on Aug. 3, 2022, the entire disclosures of which are incorporated herein by way of reference.

FIELD OF THE INVENTION

The invention relates to a manufacturing method for manufacturing a profile rail for a floor of a vehicle wherein the profile rail has a base made of a first material and a top portion to be exposed during use of the profile rail in the floor of the vehicle comprising a second material that is harder and/or less corrosive as the first material. Further, the invention relates to a profile rail obtainable by such method, a mounting system for mounting objects in a cabin of a vehicle and a floor of a vehicle, a vehicle equipped with such profile rail, as well as different uses of such a profile rail.

BACKGROUND OF THE INVENTION

For the technical background of the invention, reference is made to the following citations:
[1] EP 2 848 533 A1
[2] US 2020/0 094 970 A1
[3] US 2009/0 302 157 A1
[4] DE 10 2015 100 189 A1
[5] DE 10 2016 208 650 A1
[6] DE 10 2019 109 149 A1
[7] DE 10 2019 133 362 A1
[8] FR 2 864 940 A1
[9] US 2016/0 130 004 A1
[10] US 2020/0 317 321 A1
[11] FR 3 048 980 A1
[12] EP 2 027 305 B1
[13] EP 3 401 419 B1
[14] U.S. Pat. No. 11,167,864 B2
[15] Cold spraying—Wikipedia, downloaded on 21.07.2022 from https://en.wikipedia.org/wiki/Cold_spraying
[16] Machining—Wikipedia, downloaded on 21.07.2022 from https://en.wikipedia.org/wiki/Machining Citations [1] to [3] disclose various systems and devices for mounting objects in a vehicle, especially for mounting objects on the floor of a vehicle. For example, objects in the form of passenger seats, partition walls or cabin monuments can be mounted on the floor of a cabin of a vehicle such as an aircraft, especially an airplane. It is common that such devices and systems comprise profile rails, e.g., seat rails with seat rail crowns, or false rails having a flat upper surface, eventually with connecting holes.

Citations [4] to [10] disclose profile rails that can be used in floors of such vehicles and especially in such mounting systems and devices. Especially, citations [4] to [10] disclose profile rails for a floor of a vehicle wherein the profile rail has a base made of a first material and a top portion to be exposed during use of the profile rail in the floor of the vehicle comprising a second material that is harder and/or less corrosive as the first material, as well as manufacturing methods for such profile rails. For example, the profile rail is a seat rail or a false rail to be used in a floor of a cabin of an aircraft or of any other transportation vehicle, especially for fixing or mounting objects such as floor parts, panels, seats, partition walls, or cabin monuments in the cabin. The profile rail has a basis made from lightweight and/or relatively cheap material, especially aluminum. The top surface is exposed to the exterior. When aluminum is used in such exposed area, it is desirable to have a surface treatment in order to avoid corrosion. Other lightweight material-some citations propose carbonfaserverstärkte kunststoffe ("CFK", which translates to carbon fiber reinforced polymer) or other fiber reinforced composites—would be objected to wear when used in exposure on a cabin floor. Hence, it is desirable to have a harder and/or more corrosive resistance second material on exposed areas and/or areas used for fixation. Citations [4] to [10] propose different techniques therefore.

Due to the tendency of aluminum false rails and aluminum seat rails to corrode, some aircraft have wide areas of the floor equipped with titanium rails in order to withstand corrosion and wear. Since titanium is expensive, there is a desire for a more cost-effective alternative, which more preferably also reduces weight, but has at least a similar performance as a full titanium rail.

SUMMARY OF THE INVENTION

An object of the invention is to provide an enhanced profile rail for use in a floor of a transportation vehicle.

The invention provides a manufacturing method for manufacturing a profile rail for a floor of a vehicle wherein the profile rail has a base made of a first material and a top portion to be exposed during use of the profile rail in the floor of the vehicle comprising a second material that is harder and/or less corrosive as the first material, characterized by:
a) providing the base made of the first material and
b) coating the top portion of the base with the second material by a cold spray process.

Preferably, the manufacturing method comprises the further step:
c) machining the coating obtained by step b) in order to provide a predefined surface structure of the top portion.

Preferably, step a) comprises the step:
a1) providing the base as a length of a C-, H-, T- or I-profile comprising at least one upper flange to be arranged horizontally in use as the top portion and at least one web to be arranged vertically in use.

Preferably, step a) comprises the step:
a2) providing the base made from the first material which is chosen from the group of materials consisting of aluminum, an aluminum alloy, Al7075, Al6061, AlLi2049, Al7136, fiber-reinforced composite material, CFK, fiber reinforced composite material with a thermoplastic matrix, fiber reinforced composite material with a thermosetting matrix, thermoplastic CFK and thermosetting CFK.

Preferably, step a) comprises the step:
a3) providing the base with projections at the top surface as basis for a seat rail crown in order to coat the projections with the second material in step b).

Preferably, step a) comprises the step:
a4) providing the base with oversized holes for generating connector holes in the top portion.

Preferably, step b) comprises the step:
b1) using as the second material one or several metallic materials from the group consisting of titanium, titanium alloy, titanium-aluminum alloy, titanium grade 2 (pure titanium), Ti3Al2.5V and Ti6Al4V.

Preferably, step b) comprises the step:
b2) using a carrier gas from the group consisting of air, inert gas, noble gas, nitrogen, and helium.

Preferably, step b) comprises the step:
b3) conducting the cold spray process with a gas pressure p with 40 bar≤p≤70 bar.

Preferably, step b) comprises the step:
b4) conducting the cold spray process with a gas temperature T with 750° C.≤T≤1000° C.

Preferably, step b) comprises the step:
b5) conducting the cold spray process with a powder having particle diameters pd with 25 μm≤pd≤60 μm.

Preferably, step b) comprises the step:
b6) applying a bonding layer on the surface area of the base material to be coated and applying the coating by the cold spray process over the bonding layer.

Preferably, step b) comprises the step:
b7) coating an upper flange to be used as top portion in use of the profile rail and an upper part of a web of the profile rail which web carries the upper flange.

Preferably, step b) comprises the step:
b8) providing a bulk mass of the second material on top of the base by the cold spray process such that a seat rail crown with a fastening channel can be formed by machining the bulk mass of second material.

Preferably, step b) comprises the step:
b9) coating the top portion of the base provided by step a4) such that the connector holes are filled or at least coated at their inner surface thereof with the second material.

Preferably, step b) comprises the step:
b10) coating the projections of the base provided by step a3) with a mass of second material such that a seat rail crown with a fastening channel can be formed by machining the mass of second material.

Preferably, step c) comprises the step:
c1) machining the coating for providing a smooth and plane coating surface.

Preferably, step c) comprises the step:
c2) providing a hook element made from the second material by machining.

Preferably, step c) comprises the step:
c3) machining a seat rail channel into the second material.

Preferably, step c) comprises the step:
c4) providing a bore in the filling of the connector holes after step b9) such that connector holes with internal cover of second material is achieved.

Preferably, step c) comprises the step:
c5) forming a seat rail crown with a fastening channel by machining the mass of second material provided by step b8) or step b9).

According to another aspect, the invention provides a profile rail for a floor of a vehicle, obtainable by a manufacturing method according to any of the preceding claims, wherein the profile rail comprises a base made of a first material and a top portion to be exposed during use of the profile rail in the floor of the vehicle wherein the top portion comprises a cold sprayed coating of second material that is harder and/or less corrosive as the first material.

Preferably, the first material is chosen from the group of materials consisting of aluminum, an aluminum alloy, Al7075, Al6061, AlLi2049, Al7136, fiber-reinforced composite material, CFK, fiber reinforced composite material with a thermoplastic matrix, fiber reinforced composite material with a thermosetting matrix, thermoplastic CFK and thermosetting CFK.

Preferably, the cold sprayed second material is a metallic material, especially a metallic material chosen from the group consisting of titanium, titanium alloy, titanium-aluminum alloy, titanium grade 2 (pure titanium), Ti3Al2.5V and Ti6Al4V.

Preferably, the profile rail comprises a bonding layer between the base and the cold sprayed upper coating. The bonding layer may also be applied by a cold spray process. For example, in a preferred embodiment, where the base is made from aluminum or aluminum alloy, the top portion comprises an upper coating of pure titanium, a bonding layer made from a titanium-aluminum alloy is preferred in order to enhance bonding of the upper layer to the base material.

Preferably, the base is a length of a C-, H-, T- or I-profile comprising at least one upper flange to be arranged horizontally in use as the top portion and at least one web to be arranged vertically in use.

Preferably, the base comprises projections at the top surface coated with the second material.

Preferably, the base comprises connector holes in the top portion wherein inner surfaces of the connector holes are coated with cold sprayed second material.

Preferably, the profile rail comprises a seat rail crown with a seat rail groove or fastening channel made from or at least coated with the second material.

According to another aspect, the invention provides a mounting system for objects in a transportation vehicle, comprising at least one or several of the profile rails according to any of the aforementioned embodiments or profile rails manufactured by the method according to any of the aforementioned embodiments.

According to another aspect, the invention provides a floor of a transportation vehicle, comprising such a mounting system or at least one or several of the profile rails according to any of the aforementioned embodiments or profile rails manufactured by the method according to any of the aforementioned embodiments.

According to another aspect, the invention provides a vehicle, especially aircraft, more specifically an airplane, comprising such a floor or such a mounting system or at least one or several of the profile rails according to any of the aforementioned embodiments or profile rails manufactured by the method according to any of the aforementioned embodiments.

According to another aspect, the invention provides a use of at least one or several of the profile rails according to any of the aforementioned embodiment or profile rails manufactured by the method according to any of the aforementioned embodiments 1) in a floor of a vehicle, especially aircraft, more especially airplane, or
2) as false rails in an aircraft floor, or
3) as seat rails in an aircraft floor, or
4) for mounting objects, especially floor panels, partition walls, cabin monuments or passenger seats, in a cabin of an aircraft.

Preferred embodiments of the invention relate to titanium coated aluminum false rails and seat rail crowns via Cold Spray process.

According to the invention a base made from a lightweight and/or relatively cost-effective first material is coated on a top portion area to be exposed in use and/or used for mounting objects by using a cold spray process (=gas dynamic cold spraying) with a harder, more wear resistant and/or more corrosive-resistant second material which may be heavier and/or more expensive as the first material.

As defined in [15], the cold spray process, i.e., cold spraying (CS)—also called gas dynamic cold spraying —, is a coating deposition method in which solid powders (1 to 50 micrometers in diameter) are accelerated in a supersonic gas jet to velocities up to ca. 1200 m/s, wherein, during impact with the substrate, particles undergo plastic deformation and adhere to the surface.

To achieve a uniform thickness the spraying nozzle is scanned along the substrate. Metals, polymers, ceramics, composite materials and nanocrystalline powders can be deposited using cold spraying. The kinetic energy of the particles, supplied by the expansion of the gas, is converted to plastic deformation energy during bonding. Unlike thermal spraying techniques, e.g., plasma spraying, arc spraying, flame spraying, or high velocity oxygen fuel (HVOF), the powders are not melted during the spraying process. For further details to cold spraying (CS) reference is made to citations [11] to [15]. As indicated and explained some of these citations, it is also possible to coat fiber reinforced composite materials such as CFRP (carbon fiber reinforced plastic) with a metallic material by using cold spraying.

As can be noted therefrom, cold spray coatings differ from coatings made with other coating deposition processes.

By the cold spray process, the powder particles undergo a plastic deformation. The particles are cold-welded to the substrate being coated.

In the following advantages of embodiments of the invention using a cold spray process over other manufacturing methods for obtaining hybrid profile rails are explained:

Being a cold process, the initial physical and chemical particle properties are retained and the heating of the substrate is minimal, resulting in cold-worked microstructure of coatings where no melting and solidification happen. In some embodiments, dynamic recrystallization with refined grains can be observed between particle and particle bonding region. Furthermore, the cold spray process allows the spraying of thermally sensitive materials and highly dissimilar materials combinations, due to the fact that the adhesion mechanism is purely mechanical. Hence, a very good bonding even between the quite dissimilar materials aluminum or CFK as first material and titanium or titanium alloy as the second material is possible.

Preferred embodiments of the invention provide one, several or all of the following further advantages:
  a very high density and hardness of the coating can be achieved
  a high homogeneity of the coating can be achieved
  a minimum surface preparation is needed
  low energy consumption
  it is possible to obtain complex shapes and internal surfaces
  high productivity due to high powder feed rate
  high deposition rates and efficiencies.

Preferred embodiments of rails are related to the passenger floor area of an aircraft.

Aluminum rails for use in floors of vehicles such as airplanes would be attractive in price and weight, but they are prone to corrosion and need to be treated, inspected and/or replaced after a certain period. Titanium rails offer a corrosion resistant alternative but they are usually expensive and heavy.

In preferred embodiments a profile rail—especially false rail or seat rail—has a base of aluminum and a coating of titanium. Preferably, the rail is machined to its final design.

False rails created from an aluminum base with a titanium coating built with the cold spray process include the benefits both from aluminum rails and titanium rails without their drawbacks. An extension of the applied method towards a seat-rail crown created by cold spray process also includes the benefits of aluminum rails and titanium rails without their drawbacks.

A profile rail according to the invention, especially a false rail, is built with a lightweight base that will carry a corrosion resistant coating. This reduces the overall weight compared to corrosion resistant titanium rails, e.g., titanium False Rails. The base can be manufactured with a rather cheap material with a cost-effective process. The final profiled rail, e.g., False Rail, with the coating built in the Cold Spray technology will result in a cost-effective overall part. Also, the application of the titanium onto the aluminum base does not require specific surface treatments, therefore the usage of hazardous materials is omitted. The same applies to the extension towards a seat rail crown produced by the Cold Spray-process.

The cold spray process can also be applied to a profile rail having a base made from other lightweight material such as fiber-reinforced composite material, e.g., thermoplastic CFK or thermosetting CFK. Although CFK is not prone to corrosion, it is desired to have a more wear resistant exposed top portion which can be achieved by a coating with a harder material such as titanium or other metallic or even ceramic materials. Reference is made to citations [11] to [15] which show that different material combinations are possible by using a cold spray process.

BRIEF DESCRIPTION OF THE DRAWINGS

Embodiments of the invention are explained below referring to the accompanying drawings in which.

DETAILED DESCRIPTION OF THE PREFERRED EMBODIMENTS

In the following preferred embodiments of a manufacturing method for manufacturing a profile rail 10 for a floor 62 of a vehicle 58, such as a passenger cabin floor of an aircraft 60, are explained in more detail with reference to the accompanying drawings.

The profile rail 10 is a hybrid profile rail made from different materials 12, 14. The profile rail 10 has a base 16 made of a first material 12 and a top portion 18 to be exposed during use of the profile rail 10 in the floor 62 of the vehicle 58 wherein the top portion 18 comprises a second material 14 that is harder and/or less corrosive as the first material 12.

The manufacturing method comprises the steps:
a) providing the base 16 made of the first material 12 and
b) coating at least the top portion 18 of the base 16 with the second material 14 by a cold spray process.

Preferably, the manufacturing method comprises the further step:
c) machining the coating 32 obtained by step b) in order to provide a predefined surface structure of the top portion 18.

Figure 11:
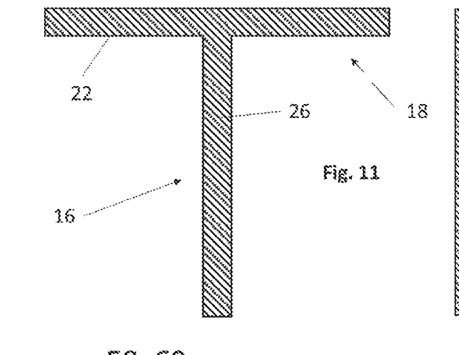
FIGS. 11 and 12 show cross sections of different variants of bases to be used in the manufacturing method for manufacturing the hybrid profile rail.
Figure 12:
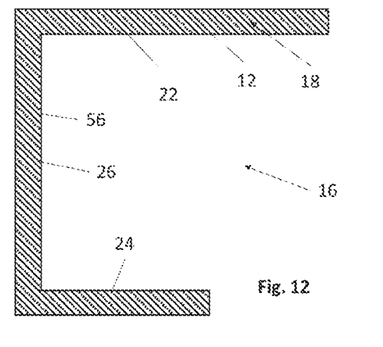

Referring to all of the Figures, the base 16 is a length of a profile element or baseline rail section 20 made from the first material 12. The base 16 may have different cross sections, wherein an I-profile or a H-profile—as depicted in the FIGS. 1 to 10 is preferred. As shown in FIGS. 11, and 12, other cross sections such as a T-profile or a C- or U-profile, Z-profile, S-profile, . . . are possible.

According to the embodiments shown in FIGS. 1 to 10 and 12, the base 16 has an upper flange 22, a lower flange 24 and a web 26 connecting the upper and lower flanges 22, 24. As shown in FIG. 11, the lower flange 24 may be omitted.

The first material 12 is a lightweight material, preferably a cost-effective material. Preferably, the first material is aluminum, especially an aluminum alloy such as Al7075, Al6061, AlLi2049 or Al7136. In other embodiments the first material 12 can be fiber-reinforced composite material such as CFK 56, especially fiber reinforced composite material with a thermoplastic matrix or fiber reinforced composite material with a thermosetting matrix such as thermoplastic CFK and thermosetting CFK, respectively. The manufacturing method as well as the hybrid profile rail 10 manufactured therewith is explained in more detail, by way of example only, with an aluminum base 16.

In use, the upper flange 22 is exposed and would be prone to wear and/or corrosion. Therefore at least the exposed surface of the upper flange 22 is coated with the second material 14 as protection against corrosion and/or wear.

Preferably, the second material 14 is a metallic material. Most preferred the second material 14 is titanium, especially titanium grade 2 (pure titanium) or a titanium alloy, preferably a titanium-aluminum alloy such as Ti3Al2.5V or Ti6Al4V.

Figure 1:
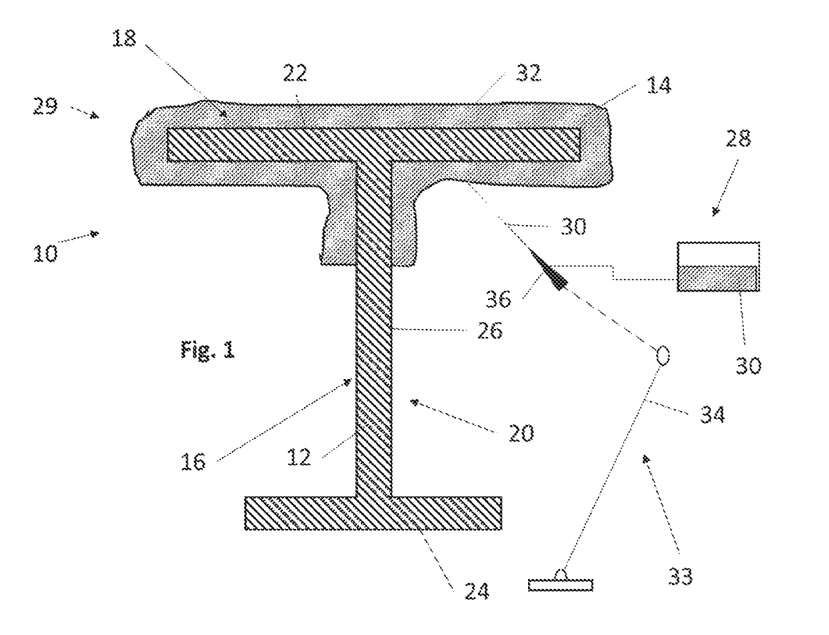
FIG. 1 illustrates schematically a step of manufacturing a hybrid profile rail according to a first embodiment wherein a cross section of the hybrid profile rail including a base made from a first material coated at least partially with a second material by a cold spray process and a cold spray apparatus are shown.

Referring to FIG. 1, the top portion 18 of the base 16 including the upper flange 22 and a part of the web 26 is coated with the second material 14 by the cold spray process. A cold spray apparatus 28 for conducting the cold spray process is shown very schematically, and not in scale with the profile rail 10.

During the Cold Spray process a metal powder is blasted with supersonic velocity onto a target substrate—here the base 16.

Referring to FIG. 1, a proposed hybrid material False Rail 29—example of the profile rail 10—is based on an aluminum baseline rail, preferable in I-shape—example of the base 16. A false rail 29 is for example used in passenger cabin floors and has a flat upper surface which connects different floor panels of the cabin.

Onto this baseline rail as base 16 titanium powder 30 is sprayed with the Cold Spray process. This results in a mechanical welding of the powder particles with the aluminum baseline rail and then with each other.

More generally, the cold spray apparatus 28 is configured to apply the coating 32 of the second material 14 onto at least one surface of the top portion 18 by conducting the cold spray process.

The cold spray apparatus 28 comprises a scanning device 33, such as a robotic arm 34, adapted and configured to scan the surface area to be coated and equipped with a cold spray head 36 as generally known, for example from [11] to [15], incorporated herein by reference.

The Cold Spray process comprises the following steps:
Mixing the powder 30 of second material 14 with gas (Air, inert gas, N2, noble gas or He)
Powder particles are accelerated by the jet of gas up to supersonic speed
Powder particles remain in solid state during spraying
Cold Spray rely only on plastic deformation to build up coatings Preferably, the cold spray process is conducted with the following parameters:
Carrier gas: He or N2 preferred
Gas pressure p: 40 bar to 70 bar
Gas temperature T: 750° C. to 1100° C.
Particle size: 25 μm to 60 μm.

Figure 2:
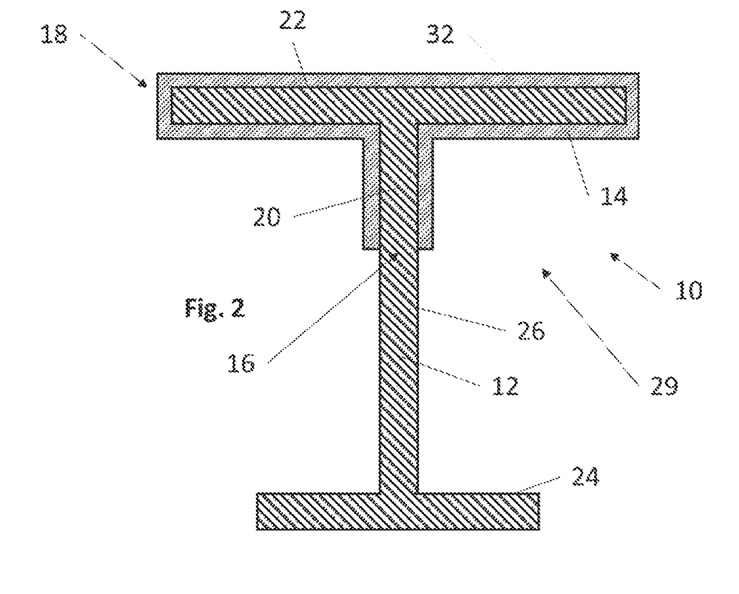
FIG. 2 shows a cross section of the hybrid profile rail after conducting a further step of the manufacturing method.

Referring to FIG. 2, this surface coating 32 can be machined later into the final surface quality. The surface coating 32 with titanium powder 30 is preferably extended around the edges of the upper I-flanges 22 and extends up to the middle of the vertical web 26.

This added titanium layer onto the aluminum baseline rail represents a corrosion resistant material. Special, sometimes hazardous, surface treatments needed for aluminum rails can be omitted.

With a coating 32 extending down to the vertical web area the risk for corrosion at the direct contact surface between aluminum and titanium can be significantly reduced as fluids can evaporate in this area.

In specific areas of the aircraft floor, so called "wet areas", a high corrosion risk is present. In order to withstand this corrosion risk usually False Rails machined completely in titanium are used. These titanium False Rails are significantly more expensive than aluminum False Rails. Therefore, this combination of an aluminum baseline rail with a Cold Spray applied titanium coating 32 offers a cost-effective alternative.

In other embodiments (not shown) the whole base 16 is coated or only a part of the upper flange 22, for example the top surface and the sides of the upper flange 22. More generally, at least a part of the profile rail 10 which is exposed so that a risk of wear or corrosion may arise is coated with the cold spray process.

FIG. 1 shows a standard false rail 29 section as example for the profile rail 10 including the base 16 made from aluminum as an example for the first material 12 and the coating 32 made by cold spraying using titanium powder 30 as an example for the second material 14. FIG. 1 shows the situation with the cold spray titanium as sprayed. FIG. 2 shows the finished false rail section after a machining step with the cold sprayed titanium machined. The machining step may comprise typical machining process steps such as cutting, grinding, boring, drilling, milling, broaching, sawing, shaping, planning, reaming, lapping and tapping, see [16] for more details.

Figure 3:
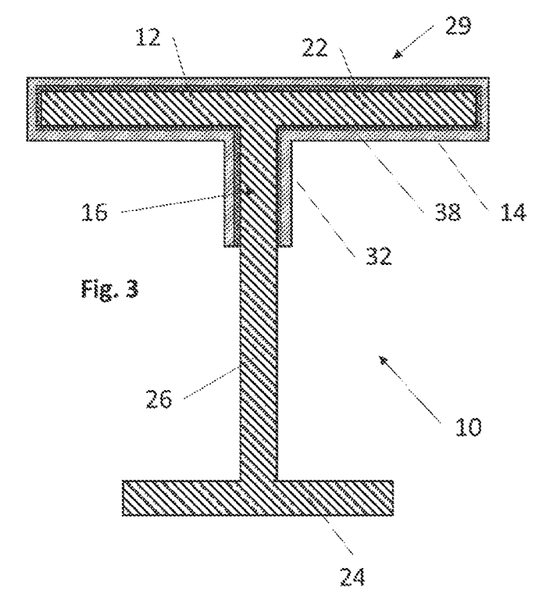
FIG. 3 shows a cross section of a hybrid profile rail manufactured by a second embodiment of the manufacturing method.

FIG. 3 shows a cross section of the profile rail 10 manufactured by a second embodiment of the manufacturing process. Here, the cold spray process comprises coating the top portion 18 with a bonding layer 38 first and then applying the second material 14 onto the bonding layer. When, for example, the more resistant and harder alloys Ti3Al2.5V or Ti6Al4V are used as the second material 14, it is preferable to use the softer Ti Grade2 as material for the bonding layer 38. More generally, the material of the bonding layer is used such that bonding of the first material 12 and the second material 14 is enhanced. The bonding layer 38 may also be applied by cold spraying (CS). The material of the bonding layer 38 can be chosen in accordance with the choice of the first and second materials 12, 14, especially in order to enhance bonding between the first and second materials 12, 14. While the bonding layer 38 is shown only in the embodiment of FIG. 3, it can be used in the other embodiments as well.

Figure 4:
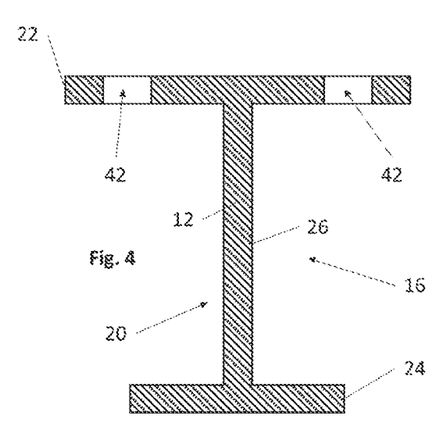
FIG. 4 shows a cross section of a base for a hybrid profile rail to be coated by a cold spray process according to a third embodiment of the manufacturing method.
Figure 5:
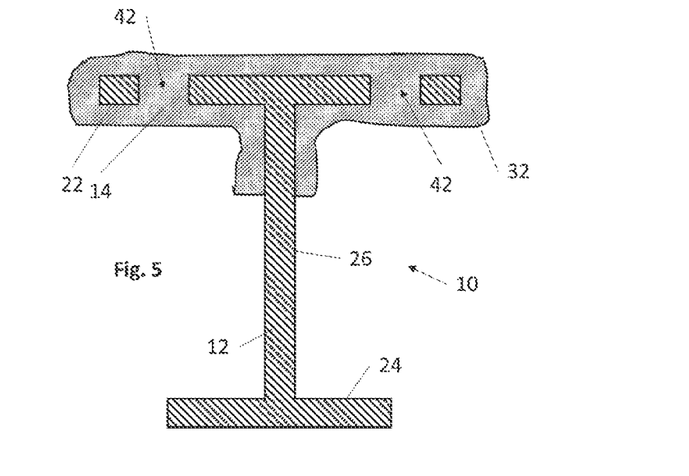
FIG. 5 shows a cross section of the coated base of FIG. 4 after the cold spray process.
Figure 6:
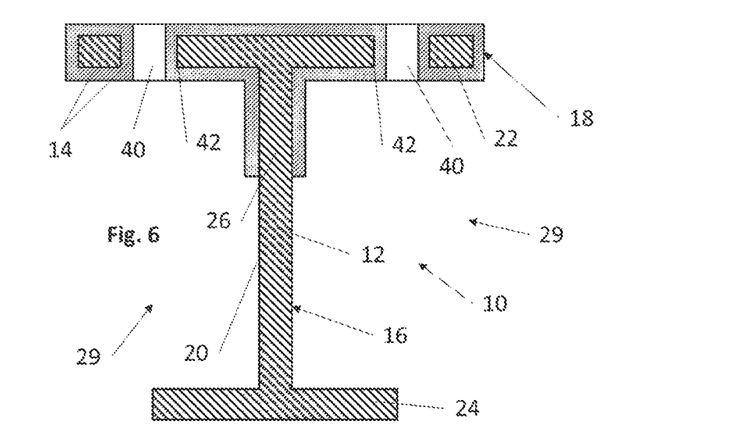
FIG. 6 shows the finished hybrid profile rail manufactured with the method according to the third embodiment with connecting holes.

FIG. 4 to 6 illustrate a third embodiment of the manufacturing process which is similar to the embodiment of FIGS. 1 and 2, but which is adapted for a manufacturing of a false rail 29 section with connector holes 40. Referring to FIG. 4, a false rail 29 baseline section made from aluminum as the first material 12 is provided as the base 16, wherein oversized holes 42 for connectors are provided in the upper flange 22. FIG. 5 shows the situation after the cold spraying. The top portion 18 is coated with titanium as the second material 14, and this second material 14 also fills the oversized holes 42. FIG. 6 shows the situation after the machining step which includes a step of generating, e.g., drilling, the connector holes 40 through the oversized holes 42 filled with titanium. Thus, the profile rail 10 is provided with connector holes 40 with an internal titanium cover.

Figure 7:
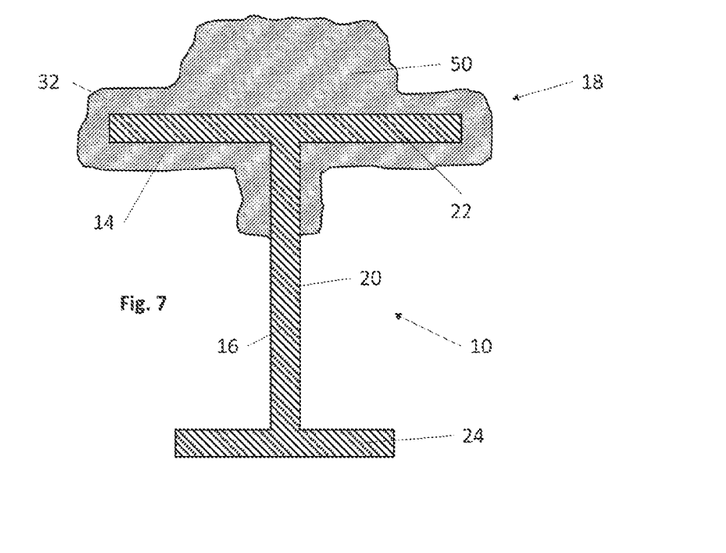
FIG. 7 shows a hybrid profile rail after a cold spray process in a fourth embodiment of the manufacturing method.
Figure 8:
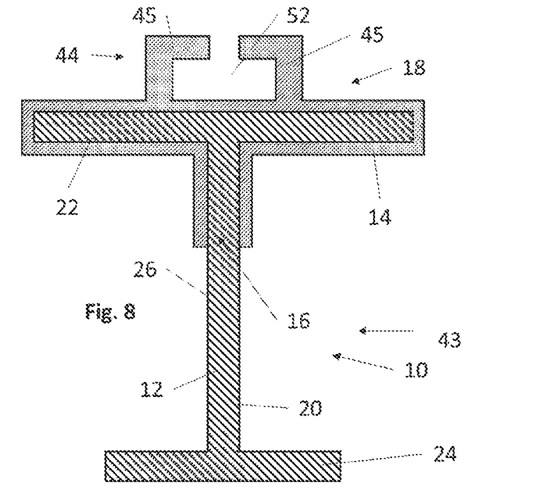
FIG. 8 shows the finished hybrid profile rail manufactured with the method according to the fourth embodiment.
Figure 9:
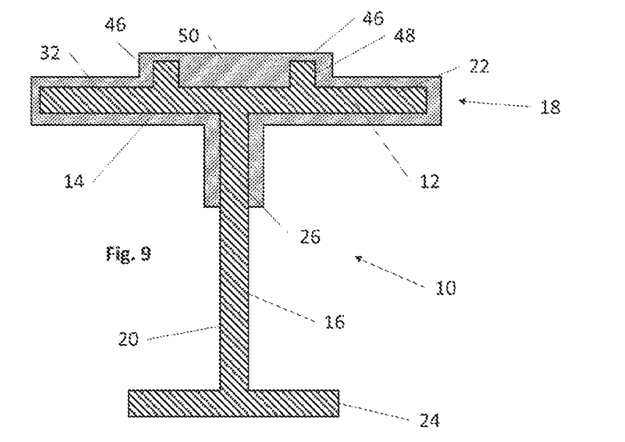
FIG. 9 shows a cross section of a hybrid profile rail after an intermediate step of the manufacturing method according to a fifth embodiment.
Figure 10:
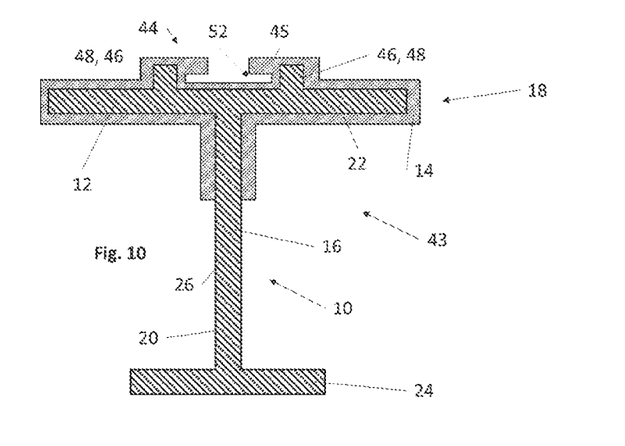
FIG. 10 shows the cross section of the hybrid profile manufactured with the fifth embodiment of the manufacturing method.

FIGS. 7 to 10 show further embodiments of the manufacturing process for manufacturing profile rails 10 in the form of hybrid seat rails 43 having a seat rail crown 44. The seat rail crown 44 has hook elements 45 defining a fastening channel in form or a seat rail crown groove 52 (dovetail slot). Different shapes of seat crowns as such are generally known, please see [1] to [10]. According to the embodiments shown, the seat rail crown 44 may be made fully from the second material 14 as this is shown in FIGS. 7 and 8, or the base 16 may be provided with protrusions 46 which form rudimentary seat crown bases 48 as shown in FIGS. 9 and 10.

FIG. 7 shows the situation after the cold spray process before machining. The second material 14 (e.g., titanium) is applied in several layers by cold spraying until a bulk mass 50 of second material 14 is formed on top of the base 16.

FIG. 8 shows the situation after machining, where the seat rail crown 44 is machined into the bulk mass 50 of second material 14. The seat rail crown 44 is fully made from second material 14.

As shown in FIGS. 9 and 10, an amount of second material 14 can be saved when at least an inner part of the seat rail crown 44 is made from the first material 12. FIG. 9 shows the situation after cold spraying and a first machining step. FIG. 10 shows the finished seat rail 43—as example of the hybrid profile rail 10—after a second machining process where a seat rail crown groove 52—here shaped as a dovetail slot—is machined into the second material 14 between the protrusions 46.

Hence, referring to the embodiments of FIGS. 7 to 10, the proposal explained above on the example of a false rail 29 as profile rail 10 can be extended towards the creation of a hybrid seat rail 43 profile as a further example of the profile rail 10. The hybrid material seat rail 43 is based on an aluminum baseline rail as base 16, preferable in I-shape. Alternatively, an I-shape baseline rail with rudimental crown-flanges—example for protrusions 46—can be used.

Onto this baseline rail, i.e., the base 16, titanium powder 30 is sprayed with the Cold Spray process. This results in a mechanical welding of the powder particles with the baseline rail and then with each other. Due to this several layers of titanium can be aggregated onto the baseline rail until a sufficient amount is reached. This amount can be machined later into the final desired seat rail-crown design. The surface coating 32 with titanium powder 30 is preferably extended around the edges of the upper I-flange 22 carrying the crown 44 and extends up to the middle of the vertical web 26.

This added titanium layer onto the aluminum baseline rail represents a corrosion resistant material. Special, sometimes hazardous, surface treatments needed for aluminum seat rails can be omitted.

With a coating 32 extending down to the vertical web 26 area the risk for corrosion at the direct contact surface between aluminum and titanium can be significantly reduced as fluids can evaporate in this area.

In specific areas of the aircraft floor, so called "wet areas", a high corrosion risk is present. In order to withstand this corrosion risk usually seat rail machined completely in titanium are used. These titanium seat rails are significantly more expensive than aluminum seat rails. Therefore, the combination of an aluminum baseline rail in with a cold spray applied titanium crown 44 according to the embodiments of FIGS. 7 to 10 offers a cost-effective alternative.

As shown in FIGS. 11 and 12, different baseline rail sections made from different first materials including CFK 56 can be used as base 16 to be coated at least partially with the wear- and/or corrosive-resistance second material 14. While corrosion is not an issue with CFK 56, the coating with a harder metal enhances resistance against wear and scratches.

Figure 13:
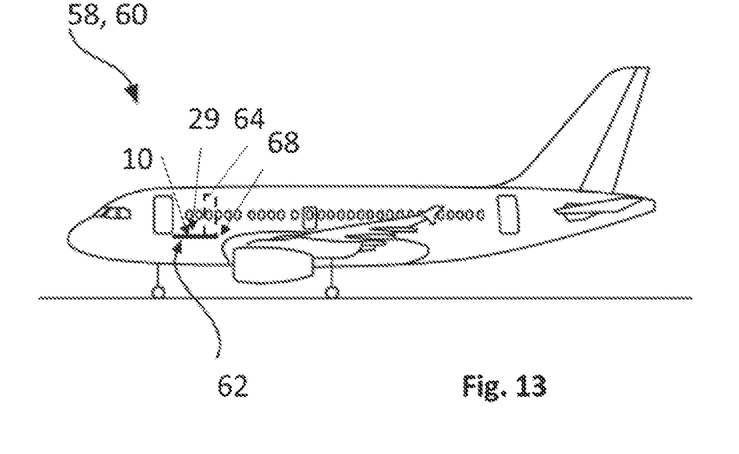
FIG. 13 shows a side view of a first example of a vehicle with a floor in which profile rails manufactured with a method according to an embodiment of the invention is used.
Figure 14:
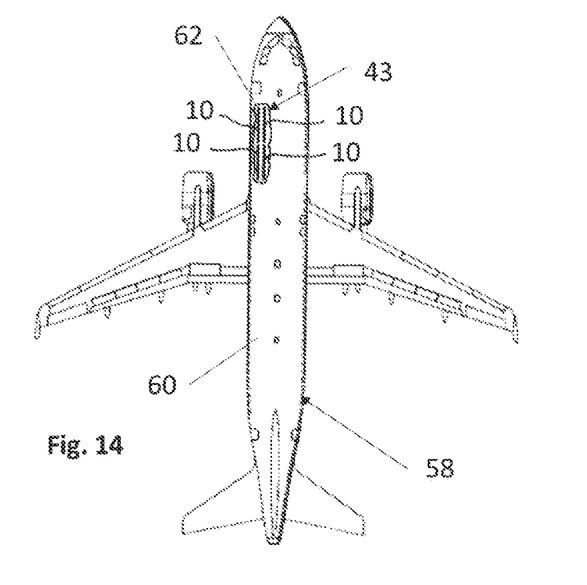
FIG. 14 shows a partly broken away top view of a second example of a vehicle with a floor in which profile rails manufactured with a method according to an embodiment of the invention is used.

The hybrid profile rail 10 can be used in floors 62 of vehicles 58, examples of which are shown in FIGS. 13 and 14. Further examples are shown and described in [1] to [10], incorporated herein by reference. Especially, the profile rail 10 can be used as false rails 29, as seat rails 43 and/or in a mounting system 68 for mounting objects 64, floor panels of false floors, seats, cabin monuments, partition walls, . . . in a cabin 66 of an aircraft 60.

In order to provide an enhanced wear and corrosion resistant hybrid profile rail (10) to be used in floors (62) of vehicles (58) such as aircraft (60), a new manufacturing method is proposed for manufacturing the profile rail (10)

that comprises a base (16) made of a first material (12) and a top portion (18) to be exposed during use of the profile rail (10) in the floor (62) of the vehicle (58) comprising a second material (14) that is harder and/or less corrosive as the first material (12). The method comprises the steps:

a) providing the base (16) made of the first material (12) and b) coating at least the top portion (18) of the base (16) with the second material (14) by a cold spray process, and preferably c) machining the coating (32) obtained by step b) in order to provide a predefined surface structure of the top portion (18).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST

10 profile rail
12 first material
14 second material
16 base
18 top portion
20 baseline rail section
22 upper flange
24 lower flange
26 web
28 cold spray apparatus
29 false rail
30 powder
32 coating
33 scanning device
34 robotic arm
36 cold spray head
38 bonding layer
40 connector hole
42 oversized hole
43 seat rail
44 seat rail crown
45 hook element
46 protrusion
48 seat crown base
50 bulk mass
52 seat rail crown groove
56 CFK
58 vehicle
60 aircraft
62 floor
64 object
66 (passenger) cabin
68 mounting system

The invention claimed is:

1. A manufacturing method for manufacturing a profile rail for a floor of a vehicle wherein the profile rail has a base made of a first material and a top portion to be exposed during use of the profile rail in the floor of the vehicle comprising a second material that is at least one of harder or more corrosive-resistant than the first material, comprising the steps:

a providing the base made of the first material, the base having a flange that is free of a hook element, a seat rail channel, and a seat rail groove, b) coating at least the flange of the base with the second material by a cold spray process, c) machining the coating obtained by step b) to provide a predefined surface structure of the top portion, wherein the machining step produces a hook element produced from the second material by machining or the machining step produces a seat rail channel or a seat rail groove into the second material.

2. The manufacturing method according to claim 1, wherein step a) comprises at least one or several of the steps:

a1) providing the base as a length of a C-, H-, T- or I-profile comprising the flange to be arranged horizontally in use as the top portion and at least one web to be arranged vertically in use, a2) providing the base made from the first material which is chosen from a group of materials consisting of aluminum, an aluminum alloy, Al7075, Al6061, AlLi2049, Al7136, fiber-reinforced composite material, carbon fiber reinforced polymer ("CFK"), fiber reinforced composite material with a thermoplastic matrix, fiber reinforced composite material with a thermosetting matrix, thermoplastic CFK and thermosetting CFK, a3) providing the flange with protrusions at a top surface as basis for a seat rail crown to coat the protrusions with the second material in step b), a4) providing the base with oversized holes for generating connector holes in the top portion.

3. The manufacturing method according to claim 2, wherein step b) comprises at least one or several of the following steps:

b1) using as the second material one or more metallic materials chosen from the group consisting of titanium, titanium alloy, titanium-aluminum alloy, titanium grade 2 (pure titanium), Ti3Al2.5V and Ti6Al4V;

b2) using a carrier gas from a group consisting of air, inert gas, noble gas, nitrogen, and helium;

b3) conducting the cold spray process with a gas pressure p with $40\ \text{bar} \leq p \leq 70\ \text{bar}$, b4) conducting the cold spray process with a gas temperature T with $750°\ \text{C.} \leq T \leq 1000°\ \text{C.}$;

b5) conducting the cold spray process with a powder having particle diameters pd with $25\ \mu m \leq pd \leq 60\ \mu m$;

b6) applying a bonding layer on a surface area of the base made of the first material and applying the coating by the cold spray process over the bonding layer;

b7) coating the flange to be used as the top portion in use of the profile rail and an upper part of a web of the profile rail, which web carries the flange;

b8) providing a bulk mass of the second material on the flange of the base by the cold spray process to be machined;

b9) coating the flange of the base provided by step a4) such that the oversized holes are filled or at least coated at their inner surface thereof with the second material;

b10) coating the protrusions of the flange provided by step a3) with a mass of second material.

4. The manufacturing method according to claim 3, wherein step c) comprises at least one or several of the steps:
c1) machining the coating for providing a smooth and plane coating surface;
c2) boring or drilling the filling of the oversized holes after step b9) such that connector holes with internal cover of second material are achieved;
c3) forming the seat rail crown with a fastening channel or the seat rail crown groove by machining the mass of second material provided by step b8) or step b9).

* * * * *